United States Patent [19]

Iishiki et al.

[11] Patent Number: 4,920,750

[45] Date of Patent: May 1, 1990

[54] HEAT EXCHANGING SYSTEM FOR POWER GENERATION

[75] Inventors: Naotsugu Iishiki, Tokyo; Shigetou Okano, Kashiwa; Shiro Mishima, Kamagaya, all of Japan

[73] Assignee: Yamato Kosan Co., Ltd., Ichikawa, Japan

[21] Appl. No.: 260,471

[22] Filed: Oct. 13, 1988

[30] Foreign Application Priority Data

| May 19, 1986 | [JP] | Japan | 61-113979 |
| Oct. 29, 1986 | [JP] | Japan | 61-257584 |
| Feb. 20, 1987 | [JP] | Japan | 62-37247 |
| Feb. 20, 1987 | [JP] | Japan | 62-37246 |
| Mar. 6, 1987 | [JP] | Japan | 62-51544 |

[51] Int. Cl.$^5$ .............................. F01K 25/00
[52] U.S. Cl. ......................... 60/671; 60/618; 60/659
[58] Field of Search ............ 60/651, 671, 670, 669, 60/618, 659

[56] References Cited

U.S. PATENT DOCUMENTS

| 1,493,368 | 5/1924 | Merz | 60/641.6 |
| 4,010,732 | 3/1977 | Sawata et al. | 60/641.15 X |
| 4,033,135 | 7/1977 | Mandrin | 60/618 |
| 4,166,363 | 9/1979 | Mougin | 60/641.6 |
| 4,262,485 | 4/1981 | Kuroda et al. | 60/669 |
| 4,471,621 | 9/1984 | Amir et al. | 60/671 X |

Primary Examiner—Allen M. Ostrager
Attorney, Agent, or Firm—Oblon, Spivak, McClelland, Maier & Neustadt

[57] ABSTRACT

This is a heat exchanger having a heating cycle part and a thermal cycle part. The heating cycle part comprises a compressor which is driven by the thermal power cycle in a heating medium circulation line connecting a radiator and an evaporator while the thermal power cycle part includes a turbo-engine in the thermal power medium circulation line connecting a condenser and an evaporator. The output shaft of the turbo-engine is connected to the compressor, and a heater as a constant heat source is provided for heating the evaporator in the thermal power medium circulation line. If the compressor is replaced with a power generator, the heat exchanger can be used as a power generator/heat exchanger of temperature-difference-driven type. The components are housed in a pressure vessel to thereby simplify the structure without necessity for a special pressure resistance structure.

4 Claims, 7 Drawing Sheets

F I G. 2
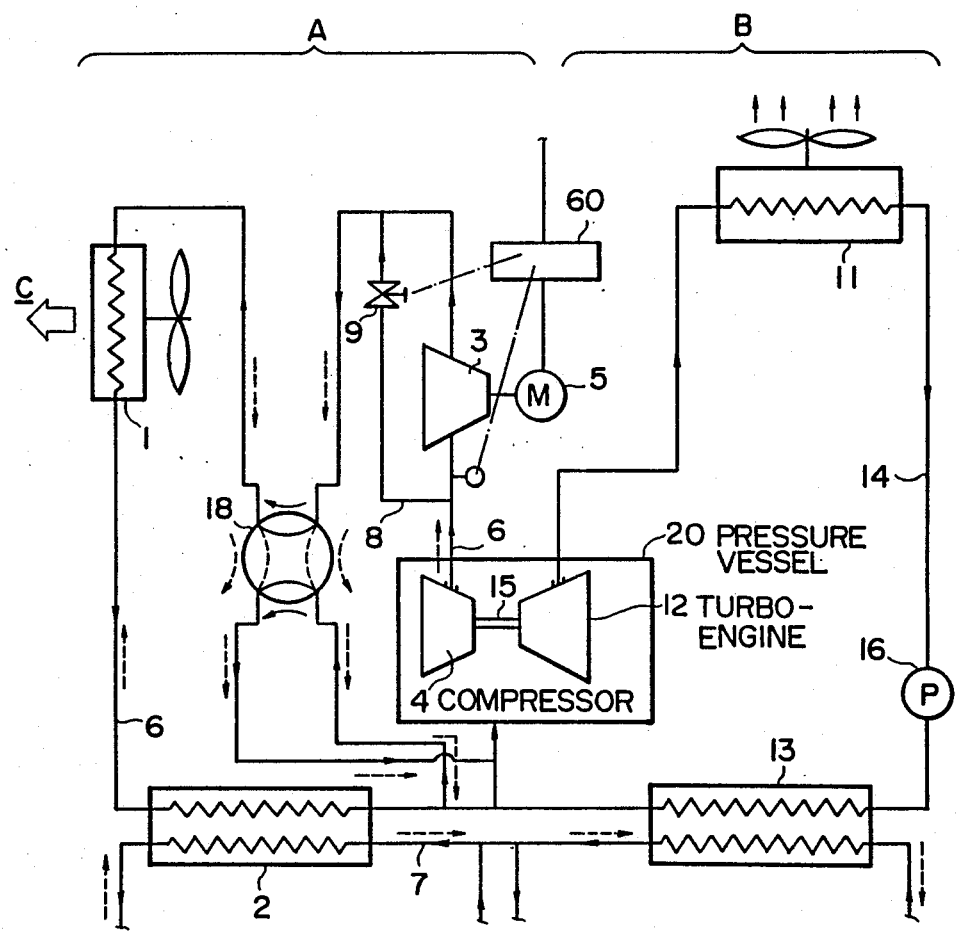

HEAT EXCHANGING SYSTEM FOR POWER GENERATION

This is a division of application Ser. No. 144,922, filed Mar. 16, 1988, now U.S. Pat. No. 4,876,856.

FIELD OF THE INVENTION

This invention relates to a heat exchanging system which generates thermal energy of high temperature by using thermal energy of low temperature and cold heat energy, and more particularly to a heat exchanging system which extracts thermal energy of high temperature from such a heat source as thermal energy of solar heat or exhaust heat or other constant temperature thermal energy, and a power generator/ heat exchanger driven by temperature differences which combines a diesel engine, gas engine or other internal combustion engine with a temperature-difference-driven engine to effectively utilize thermal energy as well as to drive a power generator.

PRIOR ART

A heat pump transmits and transfers thermal energy by utilizing vaporization heat generated during vaporization of a heating medium and condensation heat generated by liquefaction thereof. For instance, a heat pump is exemplified by a heater which becomes hotter as the outdoor atmospheric temperature lowers. There has been known a heater wherein a heat pump is driven by another heat engine. The heater drives a heat engine by the differences in temperature between the cold atmospheric temperature and a constant temperature of a heat source, a motor is connected to the output shaft of the heat engine via an automatic centrifugal clutch, and when the output of said heat engine is sufficiently large, said clutch is automatically connected by a controller to thereby actuate the heat pump directly with the output of the heat engine, to extract heat from the constant temperature heat source with said pump and to guide the heat to a radiator, and when the output of said heat engine is not sufficient, said clutch is automatically switched off by the controller to actuate the heat pump by the power generator.

As in the conventional heater system with an automatic clutch and a controller, when the output from the heat engine is insufficient, the power on the side of the heat engine is switched off and the heat pump is driven by the output from the motor; thus a large electric power of the motor is required. Moreover, the changes in output on the side of the heat engine arc not always correctly followed by the controller or the automatic clutch, the heat pump is often driven by the low output of the heat engine while the motor has not yet been actuated, presenting a trouble in operation of the heat pump and hence of the heating system. The electric motor is usually connected to a compressor of the heat pump. A motor is usually assembled integrally with a compressor in a sealed case in a heater. If a rotational output shaft of a heat engine is connected with such an assembly additionally, a structure becomes weak and the heat in the heat pump system will leak from the connections. In the non-sealed type having a compressor and a motor separately, the size of the compressor and the motor is too large to be used as the heater of this type.

There is also known a power generator/heater which actuates a generator by a gas turbine or a diesel engine, and uses the waste heat of the diesel engine as the heat source for another heater system to thereby concurrently supply electric power and heat. As the fuel used for actuating the diesel engine is partly converted to electric energy and partly into heat energy, the power generator per se is driven directly by the diesel engine. The waste heat from the diesel engine is not utilized as an energy for power generation at all.

The above mentioned power generator/heater is a system which supplies electricity and heat simultaneously. Although it enhances the use efficiency of the primary energy such as fuels, as far as power generation is concerned, it is controlled by the capacity of the diesel engine alone. The power generation efficiency cannot, therefore, exceed that of the diesel engine, and it is, in a sense, not unlike a conventional power generator system which does not use waste heat at all.

An object of this invention, accordingly, is to provide a heat exchanging system which can be actuated by itself without relying on another mechanism either by using solar heat or waste heat or using a constant temperature heat source such as a heater, a burner or a boiler even in the environment where the solar heat or waste heat can not be used to thereby extract high temperature heat energy from low temperature heat energy.

Another object of this invention is to provide a power generator/heat exchanger of a temperature-difference-driven type which utilizes heat energy of low temperature, rotational driving energy of a diesel engine, heat energy generated by a diesel engine, or heat energy obtained from other heat source devices as the energy for power generation to conduct power generation at high efficiency, which does not need to structure a temperature-difference-driven engine incorporated in the system with a pressure resistance structure, which can lubricate parts with a high efficiency, and which can be structured compactly as a whole.

DISCLOSURE OF THE INVENTION

A heat exchanging system according to this invention includes a heating cycle part comprising a radiator, an evaporator, and a compressor which are connected in a closed circuit for heating medium circulation, and a thermal power cycle part which comprises a condenser, an evaporator, and a turbo-engine which are connected in a closed circuit for thermal power medium circulation and is characterized in that the output shaft of said turbo-engine is connected to said compressor so as to use the same as the source of driving power of the compressor, and the evaporator of said thermal power medium circulation line is heated with a constant heat source.

In the heater/power generating system or a power generator/heat exchanging system according to this invention, a temperature-difference-driven engine is provided in a main heating medium circulation line connecting a radiator with an evaporator, a generator is mounted on an output shaft of said temperature-difference-driven engine, the heat generated by the operation of an internal combustion engine and the heat collected from other external heat sources are supplied to said evaporator via an auxiliary heating medium circulation line, and said generator is actuated by said temperature-difference-engine to thereby conduct heat exchange with said radiator and said evaporator as well as power generation with said generator.

Said turbo-engine and compressor or said temperature-difference-driven engine and power generator are housed within a sealed pressure vessel filled with heating medium. Therefore said turbo-engine and compressor do not need to be constructed with a special pressure resistant structure, thus reducing the size of the system as a whole. Moreover, as this system uses a constant temperature heat source, stable heat exchange can be conducted. Further, even if in the environment where solar heat or waste heat cannot be utilized, the heat exchanger or evaporator in the thermal power cycle part can be heated by such a constant heat source as a heater, burner or boiler, the system can operate independently, and is applicable to the usages similar to that of an absorption type water cooler/heater.

BRIEF DESCRIPTION OF THE DRAWINGS

FIG. 2 is a block diagram to show another embodiment of the heat exchanging system according to this invention.

OPTIMAL MODE EMBODYING THIS INVENTION

This invention will now be described in more detail referring to attached drawings.

Figure 1:
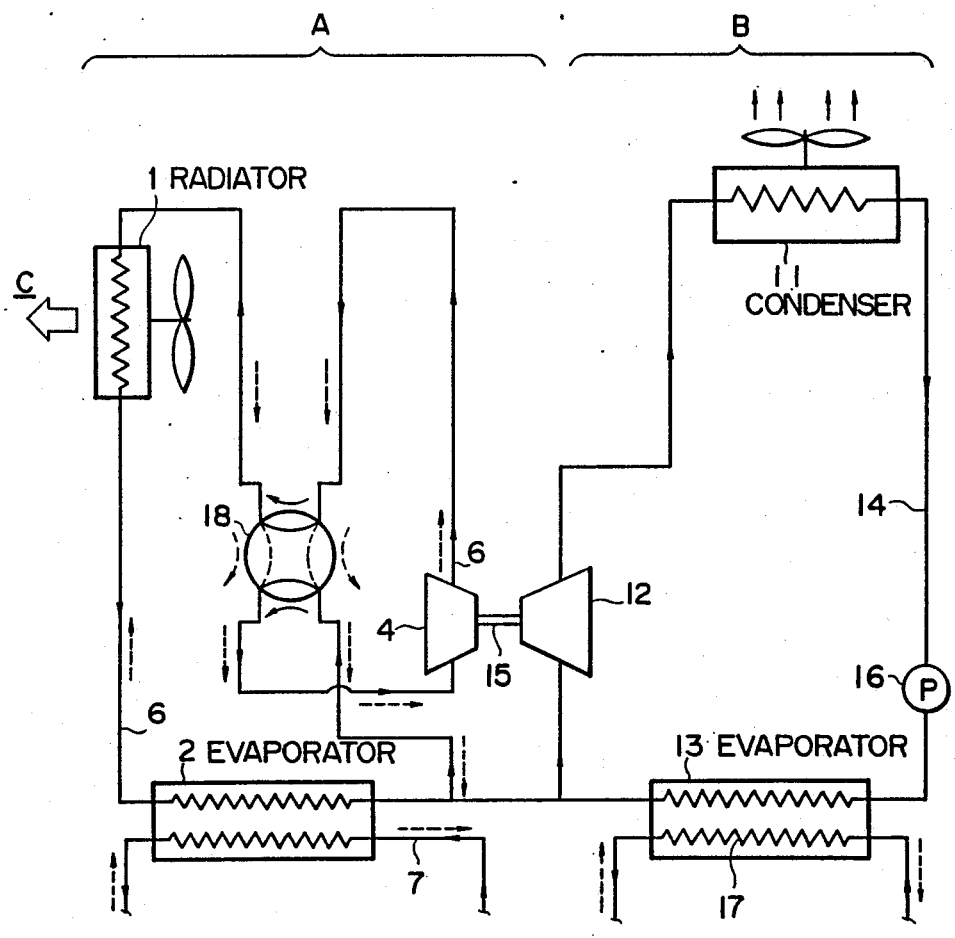
FIG. 1 is a block diagram to show an embodiment of a heat exchanging system according to this invention.

FIG. 1 shows an embodiment of this invention system applied to a heater. The heater comprises a heating cycle part denoted with a letter A and a thermal power cycle part denoted with a letter B. The heating cycle part A comprises a radiator 1 which gives heat to an object C, an evaporator 2 which is a constant temperature heat source for the heater, and a compressor 4 which is driven by an expander (turbo-engine) 12. The radiator 1, the evaporator 2 and the compressor 4 are connected with a pipe 6 in a closed circuit, and a heating medium such as fluorocarbon is sealed in the circuit. The compressor 4 is a turbine type in this embodiment. The evaporator 2 is adapted to be fed with the heat from a solar heat collector or other waste heat collecting devices installed outside the part A via a pipe 7 and to exchange the heat with the heating medium in the circuit. A switch is provided for using this system as a cooler in the figure which will be described herein.

The thermal power cycle part B comprises a condenser 11 which is exposed to cold outdoor air, an evaporator 13 which exchanges heat with a constant temperature heat source (heater, burner, etc.) 17, an expander (turbo-engine) 12 which is an engine driven by temperature differences, and a pipe 14 which connects the above elements in a closed circuit to construct a thermal power medium circulation line. The turbo-engine 12 is a turbine type rotary engine which is provided with nozzles at the inlet side of the pipe 14, and a rotary output shaft 15 thereof is connected to an input shaft of the compressor 4 of the heating cycle part A. A pump 16 may be provided, if necessary, on the pipe 14 in the part B. A heating medium which changes its phase between gas and liquid, such as fluorocarbon, is sealed in the pipe 14. The medium in the thermal power cycle part is referred to here as a thermal power medium.

The operation of the part B will now be described. When a difference exists between the temperature of the cold outdoor air to which the condenser 11 is exposed and that of the constant temperature heat source (the heater 17) of the evaporator 13 in the part B, the thermal power medium which has been gasified by the evaporator 13 by said heat source is introduced into the turbo-engine 12 via the pipe 14, is liquefied by the cold outdoor air at the condenser 11, and is gasified again at the evaporator 13 while circulating within the line. The inside of the turbo-engine 12 is applied with negative pressure by the contraction of volume entailed by the change of the medium from gaseous phase to liquid phase, and the medium in gaseous phase introduced from the pipe 14 is jetted from the nozzle to rotate a rotor in the turbine thereby giving rotation on an output shaft 15. The colder the outdoor air, the greater becomes the difference in temperature between the condenser 11 and the evaporator 13 on the side B, and the stronger the injection of the gas from the pipe 14 onto the turbo-engine 12 the greater the output power. The power is used to drive the compressor 4 in the heating cycle part A.

In the part A, the heating medium in the circuit circulates among the radiator 1, the evaporator 2, and the compressor 4 in the direction marked with an arrow of solid line. The medium is gasified by the constant temperature heat source in the pipe 7 on the side of the evaporator 2, circulated to the compressor 4, and condensed into liquid by the radiator 1. By condensation, heat is radiated from the radiator 1 toward an object C such as the inside of a room. The liquidized medium is cycled back to the evaporator 2 in the part A. In this manner, the medium is circulated in the lines while shifting between the gas phase and the liquid phase to supply heat via the radiator 1. In the part A the heating medium is circulated by the operation of the compressor 4 which is driven in this embodiment by a turbo-engine 12 utilizing the differences in temperature between the outdoor air in the thermal power cycle part B and the constant temperature heat source 17.

For using the above heater as a cooler, a four-way valve 18 of electric control type is provided in the pipe 6 in the embodiment shown in the figure. While in the heating mode the heating medium in the part A flows in the direction marked with the solid line arrow, and in the cooling mode the refrigerant flows in the direction marked with a broken line arrow. In the cooling mode, the radiator 1 acts as an evaporator and the evaporator 2 acts as a condenser to output cooled air to the object C. A suitable cooling tower is installed in order to make the evaporator 2 act as a condenser. As the constant temperature heat source in the part B, heat is supplied by a heater, a burner or a boiler. The direction of the thermal power medium current inside the lines does not change, and hence the rotational direction of the turbo-engine 12 does not change.

In the embodiment shown in FIG. 2, the heating cycle part A comprises further a spare compressor 3 which is driven by a motor 5 and a compressor 4 which is driven by a turbo-engine 12 in the part B on the pipe 6 connecting the radiator 1 which supplies heat to the object C and the evaporator 2 which is a constant temperature heat source, and said turbo-engine 12 and the compressor 4 are housed inside a pressure vessel 20. The radiator 1, the evaporator 2, the spare compressor 3, the pressure vessel 20 and the compressor 4 are connected by the pipe 6 in a closed circuit, and a heating medium such as fluorocarbon is sealed in the circuit of the part A. The compressor 3 and the motor 5 are preferably of a type sealed in a case integrally. The same reference numbers denote the same parts in FIG. 2 as those in FIG. 1, and duplication in description is minimized.

The thermal power cycle part B comprises a condenser 11 exposed to cold outdoor air, for instance, an evaporator 13 which exchanges heat with the heat source on the part B (such as a solar heat collector), a turbo-engine which is the temperature difference engine in a pressure vessel, and a pipe 14 which connects above elements in a closed circuit to construct a thermal power medium circulation line. The evaporator 13 may be connected to the same heat source as the evaporator 2 of the part A. The turbo-engine 12 is a rotary engine of turbine type which is open to the inside of the vessel 20 to introduce the medium therein. The rotary output shaft 15 thereof is connected to an input shaft of the compressor 4 of the part A.

Figure 3:
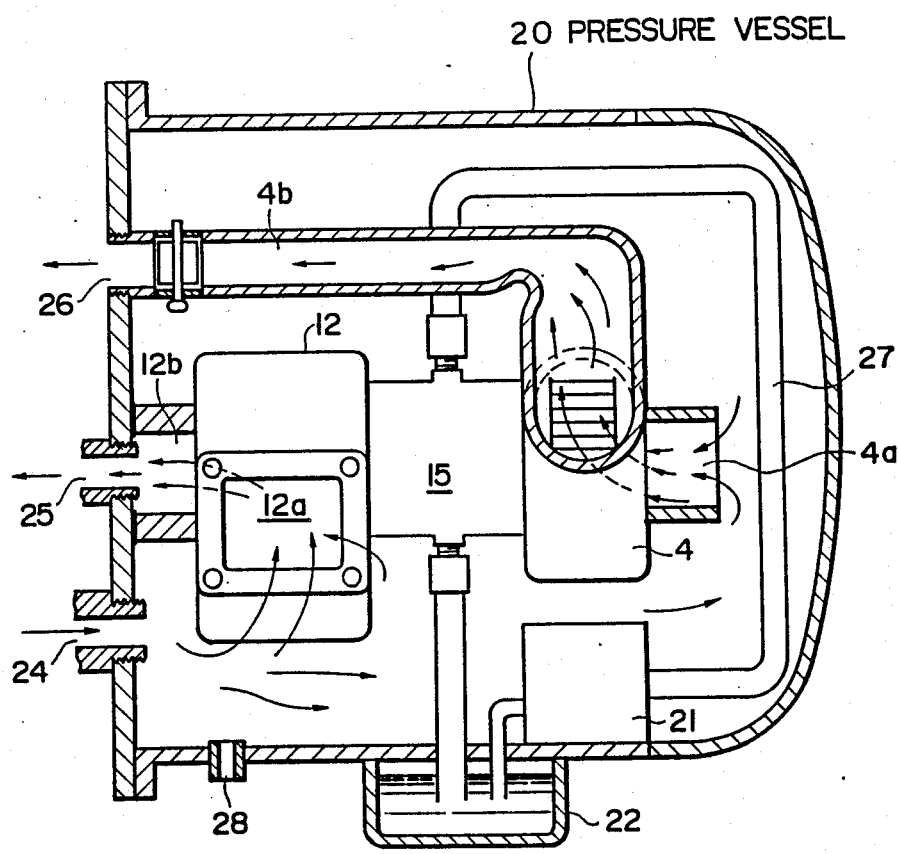
FIG. 3 is a cross sectional view to show the internal structure of a pressure vessel used in the embodiment shown in FIG. 2.

FIG. 3 is a cross section of the pressure vessel 20 of the embodiment shown in FIG. 2, and the turbo-engine 12 and the compressor 4 contained therein. An inlet 12a of the turbo-engine 12 and an inlet 4a of the compressor 4 are open to the inside of the vessel 20, and outlets 12b and 4b thereof are communicated to outlets 25, 26 of the vessel. The lines of the heating medium and of the thermal power medium are communicated to an inlet 24 of the vessel 20 via the pipes 6, 14 respectively so that medium is filled in the vessel and directed to the turbo-engine 12 and the compressor 4 via the inlets 12a and 4a. Inside the vessel 20 are provided a lubricant oil pump 21, a lubricant oil pipe 27 and an oil tank 22 for lubrication of the output shaft 15 of the engine 12, and if necessary, there is formed a recovery port 28 for the medium (fluorocarbon) and lubricant oil. As the turbo-engine 12 and the compressor 4 are housed in the pressure vessel 20, they do not need to have a pressure resistant structure.

The thermal power cycle part B is operated as follows: When there is a difference in temperature between the cold outdoor air to which the condenser 11 is exposed and the heat source of the evaporator 13 on the part B, the medium which has been gasified in the evaporator 13 by said heat source is directed from the pipe 14 into the pressure vessel 20, to the turbo-engine 12, and to the condenser 11 via the pipe connected to the outlet of the turbo-engine, is liquidized in the condenser 11 with the cold outside air, is gasified in the evaporator 13, and is circulated in the line. As the inside of the turbo-engine 12 is applied with a negative pressure by the reduced volume due to the phase transition of the thermal power medium from gas to liquid, the gas medium is filled in the vessel 20 to rotate the rotor of the turbine and gives rotation to the output shaft 15. The colder the outdoor air is, the greater becomes the difference in temperature between the condenser 11 and the evaporator 13 of the part B, and the greater the injection of the gas from the pipe 14 to the vessel 20 to output the greater power. The power is used as the force to drive the compressor 4 in the part A.

In the part A, the heating medium in the line circulates among the radiator 1, the evaporator 2 on the side A, the pressure vessel 20, the compressor 4 and the motor-driven compressor 3 by the operation of the compressor 3 driven by the motor 5, in the direction marked with the solid line arrow. The heating medium is gasified with the constant temperature heat source at the evaporator 2 on the part A, is fed to the compressor 4 and the motor-driven compressor 3, and is condensed by the radiator 1 to liquid. By condensation, heat is radiated to the object such as inside of a room from the radiator 1. The medium which has been liquidized is cycled back to the evaporator 2. In this manner, the heating medium is circulated to radiate heat via the radiator 1 during the transition from gas to liquid phase. In the heating cycle part A, the heating medium is circulated by the operation of the compressor 3 driven by the motor as mentioned above, and in this embodiment the operation by the compressor 4 helps the medium to circulate. The compressor 4 is driven by the turbo-engine 12 which uses the difference in temperature between the outdoor air of the thermal power cycle part B and the heat source such as the waste heat. By the working of this compressor 4, the load imposed on the motor-driven compressor 3 is alleviated to thereby reduce the required capacity and the power consumption of the motor 5. When the temperature difference at the part B is sufficiently large and the driving force of the turbo-engine 12 is also large enough, the spare compressor 3 does not need to be operated, and the motor 5 may be suspended. Depending on the installing environment and surrounding environment, when the system is desired to be operated by the power from the compressor 4 alone, a bypass pipe 8 may be provided on the pipe 6 for the compressor 3 to open the valve 9 so that the compressor 3 may be omitted from operation. An inverter 60 is provided on the power supply line of the motor 5 for controlling the number of revolution of the motor 5. More particularly, the pressure of the heating medium flowing in the pipe 6 of the part A is detected via the controller and the detector so that the number of revolution is automatically controlled in correspondence to the pressure. As soon as the motor is suspended, the switching valve 9 is automatically opened for the bypass pipe 8. In order to use the heater as a cooler, an electric four-way valve 18 is also provided on the line of the pipe 6 in this embodiment.

As in the embodiment of FIG. 2, the compressor 3 which is driven by a motor and the compressor 4 which uses the temperature difference between the heat source and the outdoor air are serially connected within a circuit for complementary purpose, so that the system can maintain the function of heat exchange even if one of the compressors 3, 4 fails. The lower the outdoor temperature is, the less power is needed for the compressor 3 on the side of motor, and sometimes even when the compressor 3 is suspended, the radiator can radiate the high temperature heat. The compressor 3 which is to be incorporated in the heating cycle part may be of a sealed type integrally formed with a motor. As the turbo-engine and the compressor 4 are housed in a pressure vessel, they do not have to have a pressure resistant structure. As the lubricant pump is housed inside the vessel to lubricate parts without the necessity to supply the same from outside, lubrication can be conducted at high efficiency and the whole structure may be compact.

Figure 4:
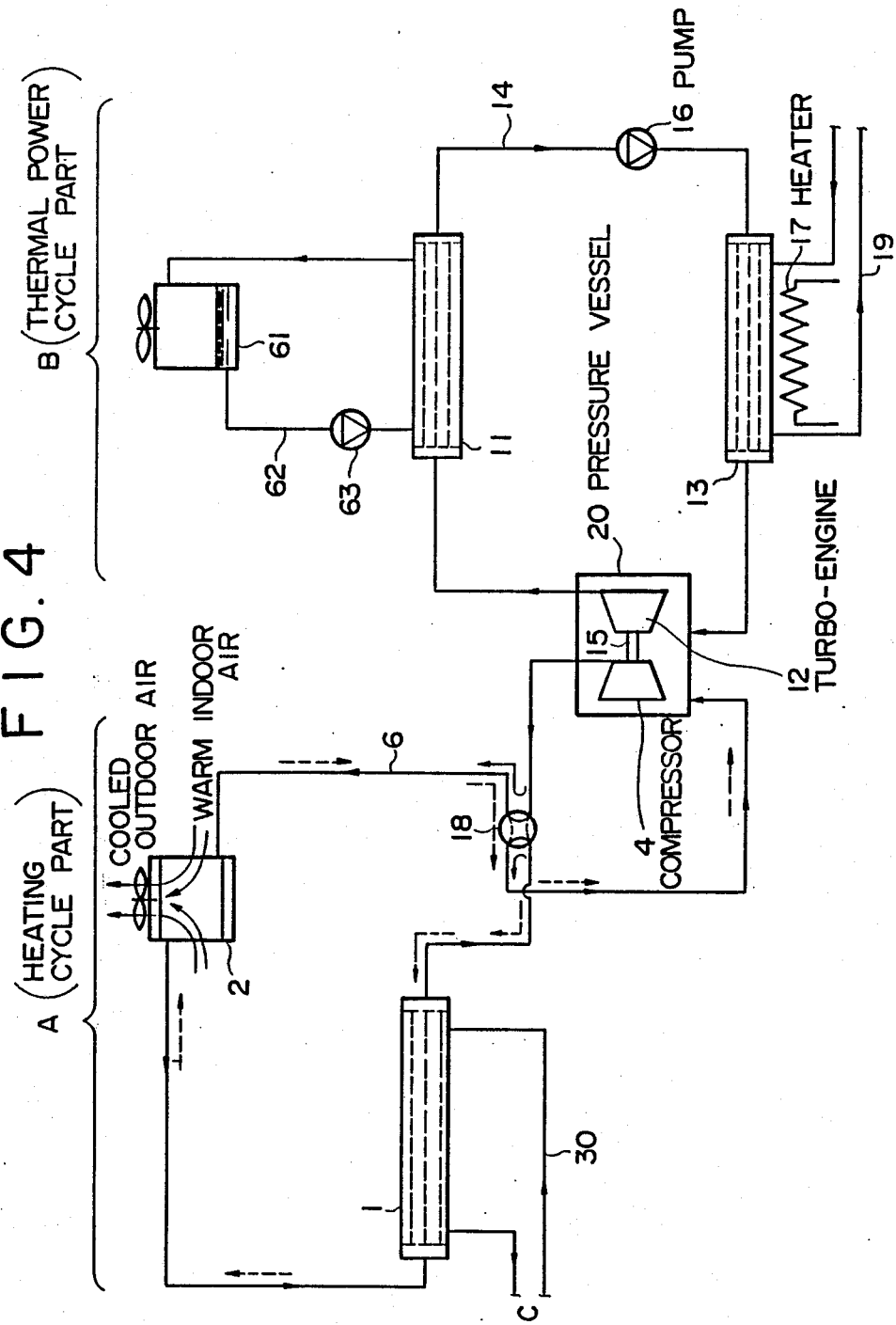
FIG. 4 is a block diagram to show a modification of the embodiment shown in FIG. 1.

FIG. 4 is a block diagram of an embodiment of the heat exchanger according to this invention applied to a water cooler/heater which comprises a heater cycle part denoted with the letter A and a thermal power cycle part denoted with the letter B. The part A comprises a radiator (a cooled water/heated water heat exchanger) 1, an evaporator (air/heat exchanger) 2 which is a constant temperature heat source (atmospheric air) of the part A, and a compressor 4 which is driven by a turbo-engine 12 of the part B which is described herein later. The radiator 1, the evaporator 2 and the compressor 4 are connected by the pipe 6 in a closed circuit in which a heating medium such as fluorocarbon is sealed. It is preferable to incorporate in a sealed manner said turbo-engine 12 and the compressor 4 in a case. The compressor 4 is a turbine type in this embodiment. The evaporator 2 is adapted to inlet warm or hot heat heated by the warm indoor air where the part A is installed, or by the outdoor air in summer time and exchange the heat with that in the heat medium to output the cool air. A switch valve 18 is provided in the embodiment in the figure for using the same system as a water cooler.

The thermal power cycle part B comprises a condenser 11 (heat exchanger on the low temperature side) which is exposed to the cool outdoor air, an evaporator 13 (a heat exchanger on high temperature side) which exchanges heat with the constant temperature heat source, a turbo-engine 12 which is a temperature difference engine, and a pipe 14 which connects the above mentioned elements in a closed circuit. The rotary output shaft 15 of the turbo-engine 12 is connected to the input shaft 15 of the compressor 4 of the heating cycle part A.

A cooling tower 61 is connected to the condenser 11 of the part B via the pipe 62 for circulating cooled water by a pump 63. The surrounding air is discharged as the warm air by a fan incorporated in the cooling tower 61. The evaporator 13 in the part B is supplied with hot water 19 of constant temperature obtained from a heater (not shown) which exchanges heat with said thermal power medium within the circuit by evaporator. The constant temperature heat source in the evaporator 13 on the part B may be steam supplied from a boiler, or direct heat from the evaporator heated by a burner or a heater 17. As the pressure vessel 20 housing the compressor 4 and the turbo-engine is identical to that shown in FIG. 3, description is omitted.

In this embodiment, the compressor 4 is driven by a turbo-engine 12 using the differences in temperature between the outdoor air in part B and the constant temperature heat source (e.g. a heater 17 in the figure) and the pressurized medium inside the vessel 20.

In the part A, on the other hand, the medium in the circuit flows from the compressor 4 to a switch valve 18, an evaporator 2, a radiator 1, a switch valve 18 and a pressure vessel 20, and finally to a compressor 4 and circulates therein as shown in FIG. 1. The heating medium is gasified by the constant temperature heat source at the evaporator 2 on the part A, and condensed to liquid by the radiator 1. By condensation, cold warm heated water is fed from the radiator 1 to the object C via a pipe 30. The liquidized medium is cycled back to the evaporator 2. In this manner, the medium is circulated through the line during the transition between the gas/liquid phases to supply hot water by the radiator 1.

The water heater can be used as a water cooler by switching the electrically controlled four-way valve 18. In the water-heater mode, the heating medium flows in a manner marked with a solid line arrow as above mentioned, but in the water cooler mode, the refrigerant flows in a manner marked with a broken line arrow. In the water cooler mode, said radiator acts as an evaporator, and said evaporator as a condenser to supply cooled water to the object C. A suitable cooling tower may be provided to make the evaporator 2 act as a condenser.

In the embodiment shown in FIG. 4, the heat exchanger or the evaporator of the cycle part B is heated with a heat source of constant temperature such as a heater, a burner, or a boiler even at places where the solar heat or the waste heat cannot be used. The system per se can be operated independently and can be applied to the usages similar to that of an absorption type water heater/cooler.

Figure 5:
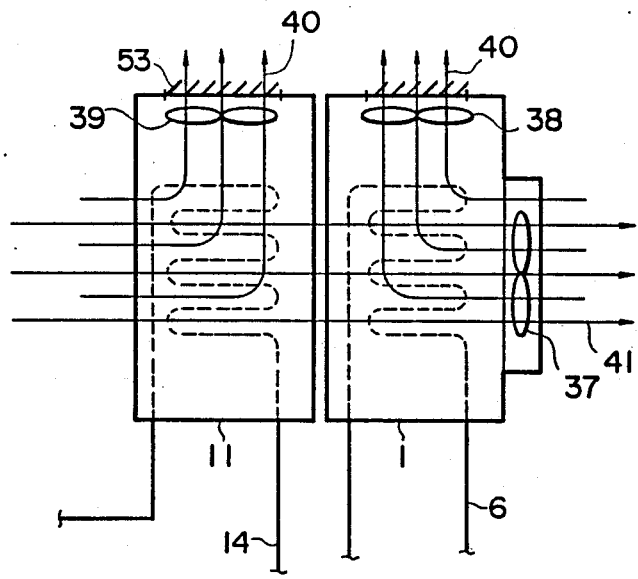
FIG. 5 is a cross sectional view to schematically show a modified arrangement of a radiator and condenser of the embodiment shown in FIG. 2.

Although the radiator 1 on the part A and the condenser 11 on the part B are separately installed at different positions respectively in the embodiments shown in FIGS. 1 and 2, they may be installed adjacent to each other outdoor and exposed to air, and a suitable fan 37 may be provided to direct the air current 41 flow from the condenser 11 on the part B to penetrate through the radiator 1 on the part A as shown in FIG. 5. In this manner the hot heat from the condenser 11 on the part B is taken into the radiator 1 on the part A to accelerate evaporation of fluorocarbon in the system by the radiator 1. The condenser 11 and the radiator 1 are provided with fans 38, 39 respectively which can be opened/closed so that the condenser 11 and the radiator 1 may use either of the fans 38, 39 without the bypass fan 37 or conversely the fan 37 alone may be used without the fans 38, 39 depending on the season or the surrounding environment. In the embodiment shown in FIG. 5, the radiator 1 is exposed to outdoor air which is hot or cold to transform the phase of fluorocarbon from gas to liquid. The system is effective especially when this invention system is structured as a heater/cooler. More particularly, in winter season the fans 38, 39 are blocked with a damper 53, and the radiator 1 is heated with the air flow 41 coming through the condenser 11. In summer time, said four-way valve is switched to the cooler mode where the fan 37 is blocked while the fans 38, 39 are activated to produce separate air flows 40 as shown in the figure. The radiator 1 and the condenser 11 are cooled with outdoor air to supply cooled water from the pipe 30 in FIG. 4 to a cooler.

Figure 6:
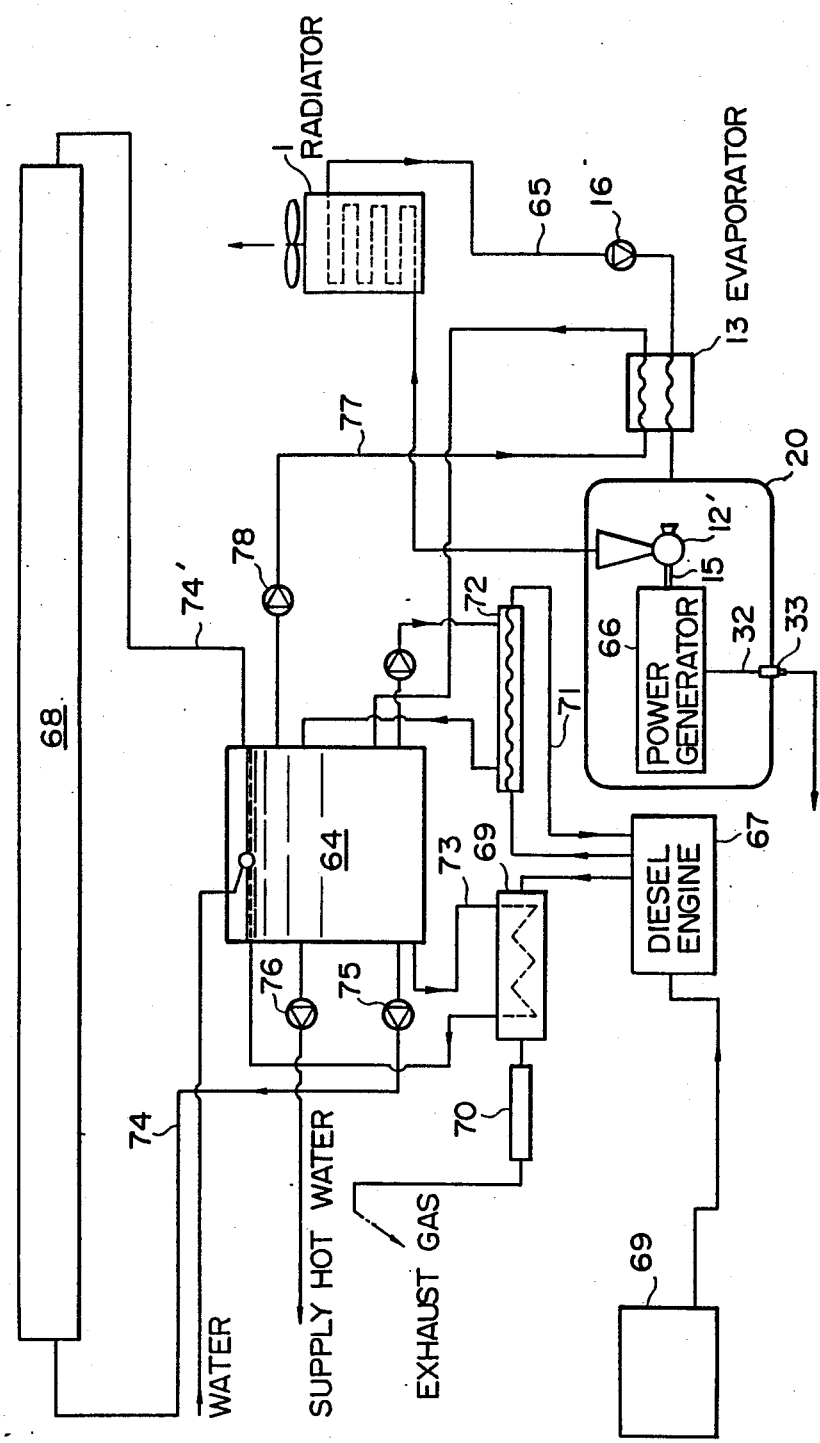
FIG. 6 is a block diagram to show an embodiment of a power generator/heat exchanger.

FIG. 6 schematically shows an embodiment of a temperature-difference-driven type power generator/heat exchanger according to this invention. The system comprises, for instance, a radiator 1 exposed to cold outdoor air, an evaporator 13 which exchanges heat with a heat source of constant temperature such as a solar heat collector 68 via a heat accumulator 64, and a pressure vessel 20 housing a temperature-difference-driven engine 12'. These components are connected with a main heating medium circulation line 65 in a closed circuit, and the main heating medium which is transformed in phase between gas and liquid such as fluorocarbon is sealed in the line 65. The line 65 may be provided, if necessary, with a pump 16. The temperature-difference-driven engine 12' is open to the vessel 20 at its inlet for the heating medium and is communicated to the main heating medium circulation line 65 at its outlet. The temperature-difference-driven engine comprises a turbine type rotational motor which has a rotational output shaft 15 connected to the driving shaft of a power generator 66 housed in the same vessel 20. In this embodiment, a diesel engine 67 is provided for driving a heat pump of the heat exchanger. A lubricant oil pump for the engine 12' is housed in the vessel 20, but the details of which will be described hereinafter. The reference numeral 69 denotes a fuel tank which supplies fuel to the diesel engine 67. The heating medium which passes through the line 65 is filled with gas in the vessel 20.

Figure 7:
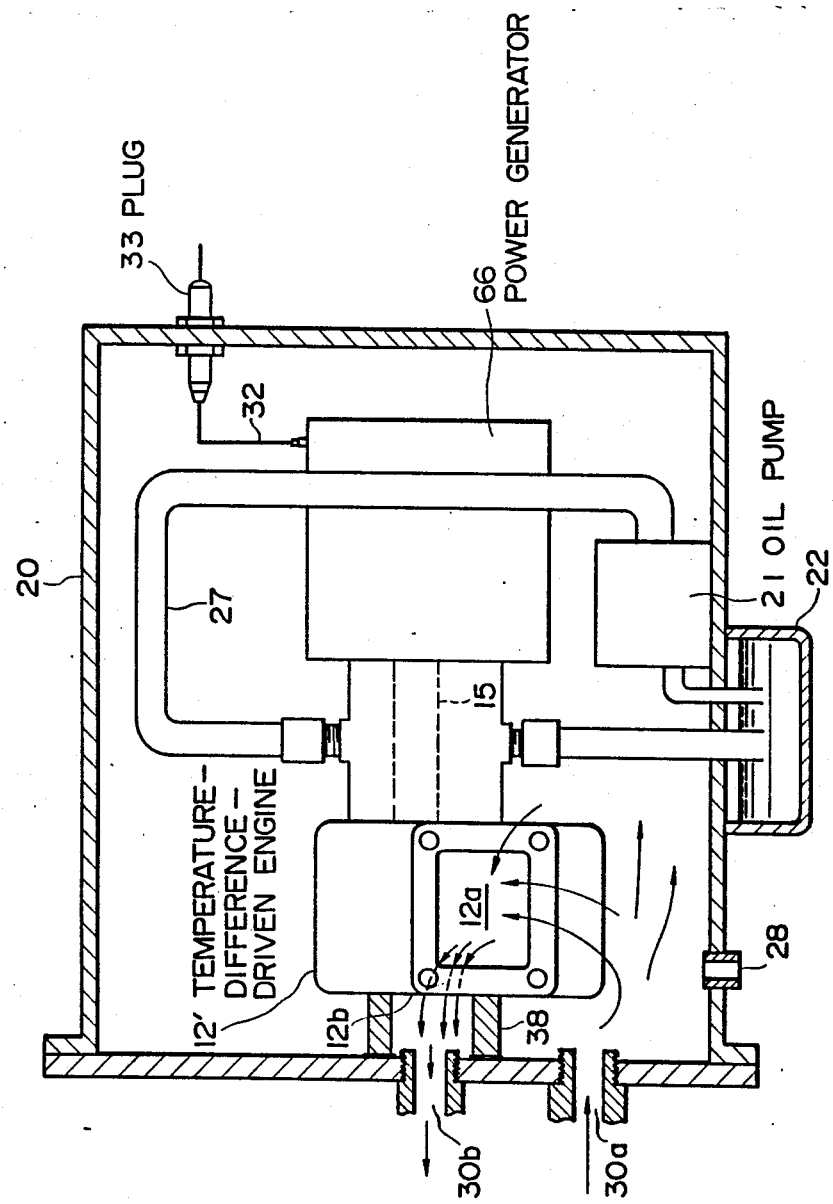
FIG. 7 is a cross sectional view to show the internal structure of an embodiment of a pressure vessel shown in FIG. 6.

FIG. 7 shows the internal structure of the vessel 20 of this embodiment shown in FIG. 6. The inlet 12a of the temperature-difference-driven engine 12' housed in the vessel 20 is opened to the inside of the vessel while the outlet 12b thereof is communicated to the discharge port 30b of the vessel via a pipe 38. The main heating medium circulation line 14 is communicated to the inlet 30a of the vessel 20 to allow the heating medium (in gas phase) to fill the vessel, be directed to the inlet 12a of the temperature-difference-driven engine to drive the engine 12', to pass through the outlet 12b, the pipe 38, the outlet 30b, and to finally reach the radiator 1 via the line 65 (FIG. 6).

The output power line 32 from the power generator 66 in the vessel 20 is led outside from a plug 33 which is screwed air-tightly on the vessel 20. The vessel 20 also houses a lubricant oil pump 21 for lubricating the engine 12' and the output shaft 15 thereof (connected to the power generator inside the vessel), a pipe 27 for the lubricant oil and an oil tank 22, and, if necessary, a recovery port 28 for the heating medium (fluorocarbon) and the lubricant. The heating medium to be introduced to the engine 12' is in the form of pressurized gas, but as the engine 12' is housed in a pressure vessel (e.g. 20 kg/cm$^2$), it is not necessary to construct the system highly pressure resistant. A universal purpose turbo-engine may be used. As parts of the engine can be lubricated within the vessel by the pump 21 which is directly driven by the power from the generator 66, lubrication is conducted efficiently.

The waste gas from the diesel engine 67 which is used to drive other power generators or other heat pumps is discharged via a waste heat exchanger 69 and a muffler 70. The cooling water of the diesel engine 67 which is heated by operation of the engine is circulated via a pipe 71 through a water-water heat exchanger 72 to be described later. To the heat accumulator tank 64 is supplied cold water a part of which is circulated via a pipe 73 between the tank 64 and the waste heat exchanger 69, and another part of which is circulated through the water-water heat exchanger 72. The solar heat collector 68 and the heat accumulator tank 64 are connected with pipes 74, 74' in a manner to allow circulation of water therebetween by the pump 75. The water in the tank 64 which has been heated by the waste heat exchanger 69, the water-water heat exchanger 72 and the solar heat collector 68 may be taken out partially by an oil feeding pump 76 to be used as an oil supply, but is mainly circulated in the evaporator 13 via the auxiliary heating medium circulation line 77 and the pump 78 in a system separate from the main heating medium circulation line 65.

When a difference in temperature exists between the outdoor air to which the radiator 1 is exposed and the heat source of the evaporator 13, the main heating medium which has been gasified by the heat source in the evaporator 13 is directed into the vessel 20 to actuate the temperature-difference-driven engine 12', then is liquidized with the cold outdoor air in the radiator 1, gasified again by the evaporator 13, and then circulated in the system. The inside of the engine 12' is applied with negative pressure as the volume is contracted due to the phase transition from the gas to liquid of the heating medium and to fill the vessel with the heating medium in gas phase. The gas rotates a rotor of the turbine to give rotation to the output shaft 15. The lower the temperature of the outdoor air is, the greater becomes the difference in temperature between the radiator 1 and the evaporator 13, and the stronger becomes the injection force of the gas from the path 65 to the vessel 20, and hence greater power is outputted. The power generator 66 is actuated with the power from the engine 12' to supply electricity.

The waste heat from the operation of the diesel engine 67 and the heat of the water which cooled the engine are accumulated in the auxiliary heating medium in the tank 64 via the heat exchangers 69, 72 to be used as the heat source for the evaporator 13 via the path 77. The higher the revolution rate of the engine 67 is, the higher becomes the temperature of the cooling water and the waste heat from the engine 67 to widen the temperature difference between the radiator 1 and the evaporator 13 and to therefore increase the power to drive the power generator by the engine 12'.

In the aforementioned embodiments, if there is a difference in temperature between outdoor and indoor, even if there is no auxiliary heating medium circulation line provided in the system, the heating medium (fluorocarbon) can be transformed from gas phase to liquid phase by the radiator 1 which is exposed to the cold outdoor air and the evaporator 13 installed indoor, and is circulated in the line to actuate the engine 12' and greater power by the power generator 66. When the power generated by the generator 66 is not sufficient, the power can be additionally generated by actuating diesel engine to drive other power generators. The diesel engine may be of the type incorporating a power generator or a heat pump.

In the embodiment shown in FIG. 6, as the temperature difference existing between the places where the radiator and the evaporator are installed respectively is utilized to drive a power generator, and as the difference in temperature therebetween is increased by the heat generated from the diesel engine for driving other power generators or other heat pumps (waste gas or water which has cooled the engine), the power can be generated at a higher efficiency without wasting energy. As the engine and the power generator are both housed in a pressure vessel, the system can be structured simply and compactly. The whole structure for the engine is not necessarily made pressure resistant. As the engine can be lubricated within the vessel by the pump, it is not necessary to force the lubricant oil from outside, and yet sufficient lubrication is guaranteed.

Industrial Application

As this invention heat exchanging system generates heat energy of high temperature by utilizing the heat energy of low temperature and cold heat energy, it is extremely useful as a heater/cooler, a heater or a cooler for offices, hotels, hospitals or households. Especially as it can use hot heat collected by a solar heat collector or various types of waste heat recovery devices to generate high heat energy, and can collect higher energy as the difference in temperature between indoor and outdoor increases, it is most suitable to a heating system which radiates higher heat as the outdoor air becomes colder. If the compressor driven by a motor or an internal combustion engine and the compressor using temperature difference are connected in series in a system, they may supplement each other. When one of the compressors fails, the other one may take over it to thereby secure the function of the system as a whole. Further, the compressor on the side of the motor can be constructed as a compact sealed type integrating the compressor with a motor.

The compressor can be activated with a constant heat source such as a heater, a burner, a boiler, etc. instead of the motor, thereby allowing independent operation of the system even in the environment where solar heat or waste heat can not be used in a manner similar to an absorption type water heater/cooler. As the system may use the temperature difference to drive the power generator, it can be used where general electric facilities are not available. The pumps and fans can be driven with the power generated by the power generator of the system, the energy is not wasted but used fully. As the compressors and the turbo-engine are all housed inside the pressure vessel, and as the pressurized medium which fills the vessel is led to the compressors and the turbo-engines, the structures thereof do not have to be pressure resistant to thereby simplify and miniaturize the system as a whole. As the lubricant pump is also housed in the pressure vessel, rotational part of the turbo-engine and the power generator in the container can be effectively lubricated.

What is claimed is:

1. A temperature difference driven type heat exchanger/power generator, comprising:
    a radiator exposed to cold outdoor air;
    an evaporator exposed to indoor air warmer than said outdoor air;
    a main heating medium circulation line connecting said radiator and said evaporator in a closed loop, whereby a main heating medium may be evaporated in said evaporator and condensed in said radiator, an amount of said evaporation and said condensation being a function of a temperature difference between said outdoor air and said indoor air;
    a temperature difference engine mounted in said main heating medium circulation line at a position wherein said temperature difference engine receives an evaporated main heating medium from said evaporator and supplies said main heating medium to said radiator, said temperature difference engine being applied with a negative pressure corresponding to a volume reduction of said main heating medium due to phase transition of the main heating medium from gas to liquid in said radiator, whereby an output of said temperature difference engine is a function of the temperature difference between said outdoor air and said indoor air;
    means for supplementing the temperature of said indoor air in said evaporator, comprising an external heat source and an auxiliary heating medium circulation line connected between said external heat source and said evaporator; and
    a power generator connected to the output of said temperature difference engine, whereby the power generated by said power generator is a function of the temperature difference between said outdoor air and said indoor air,
    wherein said temperature-difference-driven engine and said power generator are housed in a pressure vessel together with a lubricant oil pump, a heating medium inlet port of said temperature difference engine is open to inside of said pressure vessel while an output port thereof is communicated to said heating medium circulation line so that the heating medium which is introduced in said temperature-difference-drive engine is filled in said pressure vessel via said main heating medium circulation line, and the output electric current from said power generator is taken out via an electric source plug attached on said pressure vessel.

2. The heat-exchanger/power generator of claim 1 wherein said supplementing means includes an internal combustion engine.

3. A temperature difference driven type heat exchanger/power generator, comprising:
    a radiator exposed to cold outdoor air;
    an evaporator exposed to indoor air warmer than said outdoor air;
    a main heating medium circulation line connecting said radiator and said evaporator in a closed loop, whereby a main heating medium may be evaporated in said evaporator and condensed in said radiator, an amount of said evaporation and said condensation being a function of a temperature difference between said outdoor air and said indoor air;
    a temperature difference engine mounted in said main heating medium circulation line at a position wherein said temperature difference engine receives an evaporated main heating medium from said evaporator and supplies said main heating medium to said radiator, said temperature difference engine being applied with a negative pressure corresponding to a volume reduction of said main heating medium due to phase transition of the main heating medium from gas to liquid in said radiator, whereby an output of said temperature difference engine is a function of the temperature difference between said outdoor air and said indoor air;
    means for supplementing the temperature of said indoor air in said evaporator, comprising an external heat source and an auxiliary heating medium circulation line connected between said external heat source and said evaporator; and
    a power generator connected to the output of said temperature difference engine, whereby the power generated by said power generator is a function of the temperature difference between said outdoor air and said indoor air,
    wherein said supplementing means includes a heat accumulation tank inserted in said auxiliary heating medium circulation line, and wherein heat generated by operation of said internal combustion engine or collected from another outer heat source is accumulated in said heat accumulation tank.

4. The heat exchanger/power generator of claim 3 wherein said supplementing means includes an internal combustion engine.

* * * * *